United States Patent [19]

Cattano

[11] 4,327,890
[45] * May 4, 1982

[54] BATTERY STRAP AND POST CAST-ON MULTI USE MOLD

[75] Inventor: John D. Cattano, Castalia, Ohio

[73] Assignee: Mac Engineering, Benton Harbor, Mich.

[*] Notice: The portion of the term of this patent subsequent to Nov. 27, 1996, has been disclaimed.

[21] Appl. No.: 83,219

[22] Filed: Oct. 9, 1979

Related U.S. Application Data

[63] Continuation-in-part of Ser. No. 850,100, Nov. 10, 1977, Pat. No. 4,175,725.

[51] Int. Cl.³ .......................... B22C 9/06; B22C 9/08; B22D 19/00
[52] U.S. Cl. .................................. 249/110; 164/332; 164/342; 164/348; 164/DIG. 1; 249/119
[58] Field of Search .............. 164/108, 109, 110, 133, 164/137, 332, 334, 342, 348, 341, DIG. 1; 249/81, 102, 110, 119, 129

[56] References Cited

U.S. PATENT DOCUMENTS

| | | | |
|---|---|---|---|
| 4,108,417 | 8/1978 | Simonton et al. | 164/348 X |
| 4,175,725 | 11/1979 | Cattano | 164/DIG. 1 X |

*Primary Examiner*—Gus T. Hampilos
*Attorney, Agent, or Firm*—Michael, Best & Friedrich

[57] ABSTRACT

A composite mold construction for casting on the connector straps, posts, and terminals for lead acid electrical storage batteries wherein the mold cavity areas are alternately heated by direct flame on one face and then chilled by a coolant on their opposite face to freeze metal in the cavities without freezing molten metal flowing in adjacent flow channels. A plurality of mold cavity partition inserts are arranged to be interchangeable in the main mold assembly to enable a single mold assembly to be utilized for several arrangements of battery cells, strappings, and terminals. Thermal distortion of the mating parts is minimized to maintain the junctions between the insert and frame free of leaks by surface geometries which provide broad surfaces of contact drawn together by bolts securing the relatively thin inserts by tapped bores in the more massive primary portions of the mold assembly.

9 Claims, 4 Drawing Figures

BATTERY STRAP AND POST CAST-ON MULTI USE MOLD

CROSS REFERENCE TO RELATED APPLICATION

This invention is a continuation-in-part of U.S. Pat. No. 4,175,725 which issued Nov. 27, 1979, for "BATTERY STRAP AND POST CAST-ON MULTI USE MOLD" by John Dale Cattano and is related to that disclosed in U.S. Pat. No. 4,108,417 of Robert D. Simonton and Carl D. Schultz, which issued for "BATTERY POST AND CONNECTOR STRAP MOLD".

BACKGROUND OF THE INVENTION

1. Field of the Invention

This invention relates to machines for manufacturing lead acid type electrical storage batteries and, more particularly, to molds for casting-on of the connector straps joining the lugs on the plates of the cells and the posts employed as cell interconnectors and terminals for such batteries.

2. Description of the Prior Art

Heretofore, it has been known to cast-on the plate lug connector straps for cells, the cell posts employed to interconnect cells, and the posts forming terminals for batteries by stacking the positive and negative battery plates with suitable interleaved insulating separators, and casting the post and the straps between the lugs of the positive plates and between the lugs of the negative plates of cells while the stacks are maintained with their lugs projecting downward. U.S. Pat. Nos. 3,718,174 and 3,802,488 issued respectively Feb. 27, 1973 and Apr. 9, 1974 to Donald R. Hull and Robert D. Simonton disclose cast-on apparatus including a loading station, a casting station and an unloading station arranged so that a carriage including cell stack clamps can be moved between the stations. The casting station has a mold assembly including a flow channel for molten metal supplied at an input from a suitable reservoir and returned from an exit to that reservoir. Mold cavities are arranged along the flow channel in a pattern and form to define the straps and posts. The cavities are filled by impeding the exit of molten metal from the flow channel so that its level rises and overflows weirs intermediate the channel and cavities by flooding an internal region of the upper surface of the mold which is enclosed by a dam, thus forming a pool of molten metal. After the cavities are overflow filled, the flow channel exit is opened to permit the level of molten metal to recede and the downwardly projecting plate lugs of the cell groups retained in the carriage are lowered into the molten metal in the registering strap mold cavities. The cavities are then chilled to freeze the molten metal and the frozen straps and posts are ejected from their cavities as the carriage is elevated to raise the plates with their cast-on straps and posts for traverse to the unloading station.

In operation, the mold assemblies in the casting station are subjected to rigorous thermal requirements. The flow channel must convey molten metal throughout the freezing of metal in the cavities, hence, its walls should remain at a temperature above the freezing point of the metal. The mold cavities should have a minimum thermal inertia so they can be rapidly raised above and then chilled below the melting temperature of the metal to provide short cycle times and economic production rates. The metallurgical requirements of the operation dictate warming the mold cavities before they are filled and deoxidizing the molten metal surface before insertion of the plate lugs. These requirements are met by directing a deoxidizing flame over the upper face of the mold assembly prior to and following the overflow filling of the mold cavities.

As disclosed in the aforenoted U.S. Pat. No. 4,108,417, the desired thermal patterns in the mold assembly are achieved by utilizing a massive base for the mold assembly in which the flow channel and its input and exit are formed and by forming the mold cavities with relatively thin walls and with coolant passages in close proximity to the cavities. Advantageously, the cavities are formed in elements separate from the base and with thermal insulating barriers between them and the base so that their relatively low thermal inertia permits rapid thermal cycling without altering the base temperature to the same extremes of temperature.

Mold assemblies and battery plate stack clamps for the machines under discussion are demountable to enable the machines to be utilized in the manufacture of a number of different battery forms. Typically, lead-acid batteries are manufactured with standard case sizes and with different cell and terminal arrangements. Thus, a given overall outer dimension for the cell assembly to be housed in a given casing might be made up of six cells having eleven, thirteen, or fifteen plates per cell, having various terminal arrangements wherein the terminals are on the same side or on opposite sides, and wherein the spacings of the lug straps or terminal and connecting posts from the longitudinal center line of the battery are different.

The demountable mold assemblies are expensive. When a mold assembly is employed for strap and post configuration, a manfacturer is required to maintain a large inventory of mold assemblies, much of which is idle at any given instant.

As shown in U.S. application Ser. No. 850,100, of which this is a continuation-in-part, a typical mold has a massive base including a heavy walled elongate body containing a central flow channel for the metal to be cast and having transverse cantilever beams to present a planar I-form. The mold cavities are formed in bodies which fit between the transverse cantilever beams on each side of the elongate body with their longitudinal sides of generally vertical orientation abutting the vertical longitudinal sides of the elongate body. These abutting faces are subject to compressive forces by side plates secured to the ends of the cantilever beams as by studs tapped into bores in the beam ends. The resulting long expanse of the joint between the insert and base paralleling the flow channel tends to work and distort under the conditions of thermal cycling to which the mold is subjected such that molten metal in overflowing the joint, enters between the base and insert and ultimately develops leaks in the mold. If the width of the abutting faces of the base and insert is increased to reduce the tendency to develop leaks, the thermal conductivity increases between the massive base and the large volume portions of the insert such that the mold cycle time is increased to reduce productivity of the mold.

SUMMARY OF THE INVENTION

The present invention relates to a mold assembly of the type discussed above which has an improved geometry which more effectively maintains a seal against the entry of molten metal at the junction between the massive base and the mold cavity containing inserts while reducing the cross-sectional area of the thermal path from the base to the cavity containing region of the insert which is subject to cyclic chilling. Thus, the invention increases mold life and reduces mold cycle time while retaining the feature permitting a number of inserts to be interchangeably substituted to establish various mold cavity arrays, thereby enabling one mold assembly to accomodate a plurality of different battery configurations for the cell connecting straps and posts.

More particularly, the invention employs a mold frame containing the molten metal flow channel as a base structure to which are secured one or more inserts having mold cavities and coolant channels proximate those cavities. The insert surfaces engage the base surfaces with generally horizontal surfaces on flanges extending outward from the main body portion such that the flange contact surfaces can be of broad extent and their cross-sectional area can be of limited extend and can space the main body portion from the base. Thus, an effective contact area to mitigate against leakage of molten metal is provided in conjunction with a limited area heat flow path to the main body portion subject to chilling. The inserts can define the entire mold cavity for post and straps or only portions of those cavities. Post cavities such as those for terminal and cell connector posts may be formed into the upper surfaces of the inserts. The bottoms of strap cavities, which are more shallow than post cavities, may also be formed on the upper surface of the inserts.

Side walls for the strap cavities and portions of side walls for the post cavities may be defined by replaceable elements or adapters for modifying the size and relative placement of the cavities. These adapters have been termed "comb plates". The comb plates fit into seats in the upper face of the inserts and can take various forms in accordance with the strap configurations desired for the battery cell assemblies to be formed.

Insert surfaces are maintained in sealing relation to the base structure by an array of bolts extending through bores in the base adjacent the flow channel to threadably engage tapped holes in the underside of the insert flanges. In a preferred arrangement, the base is made as a one piece frame with a center longitudinal bar containing the lower portion of the flow channel for the molten metal and the insert has a flange around the entire periphery of its main body portion which is secured to the base by means of bolts engaging tapped holes arranged around the flange to draw it down against the base with a uniform distributed force. Portions of the flange adjacent the flow channel thus form the upper walls of the flow channel.

Where comb plates are used, thermal cycling of the comb plates is severe since they are contacted directly by flame in the heating and deoxidizing steps of the cast-on-process and are in intimate contact with the chilled inserts during the solidification of the molten metal. The strap cavities are relatively shallow and the comb plates are thin. They tend to distort during thermal cycling. In order to minimize these distorting effects, the comb plates are secured to the inserts on which they are mounted by pins or keys at junctions with the insert. A plurality of comb plates can be provided for each insert to enable different strap combinations to be formed for different battery configurations. For example, a single mold frame and a set of mold inserts can be employed with three different sets of comb plates for the casting on of straps and posts for six cell batteries having eleven, thirteen, or fifteen plates per cell.

In accordance with the above, an object of this invention is to increase the life of mold assemblies for battery strap and post cast-on molds.

Another object is to enable a plurality of different battery strap and post configurations to be accomodated in a single major mold structure.

A third object is to avoid or minimize thermal distortion in battery strap and post mold assemblies.

A fourth object is to reduce thermal conduction between the portion of a mold subject to cyclic heating and chilling, to freeze metal admitted thereto in a molten state, and the portion of the mold which maintains metal in a molten state continuously.

BRIEF DESCRIPTION OF THE DRAWINGS

The above objects and features are realized with apparatus as disclosed in the accompanying drawings wherein.

DETAILED DESCRIPTION OF THE PREFERRED EMBODIMENT

Figure 1:
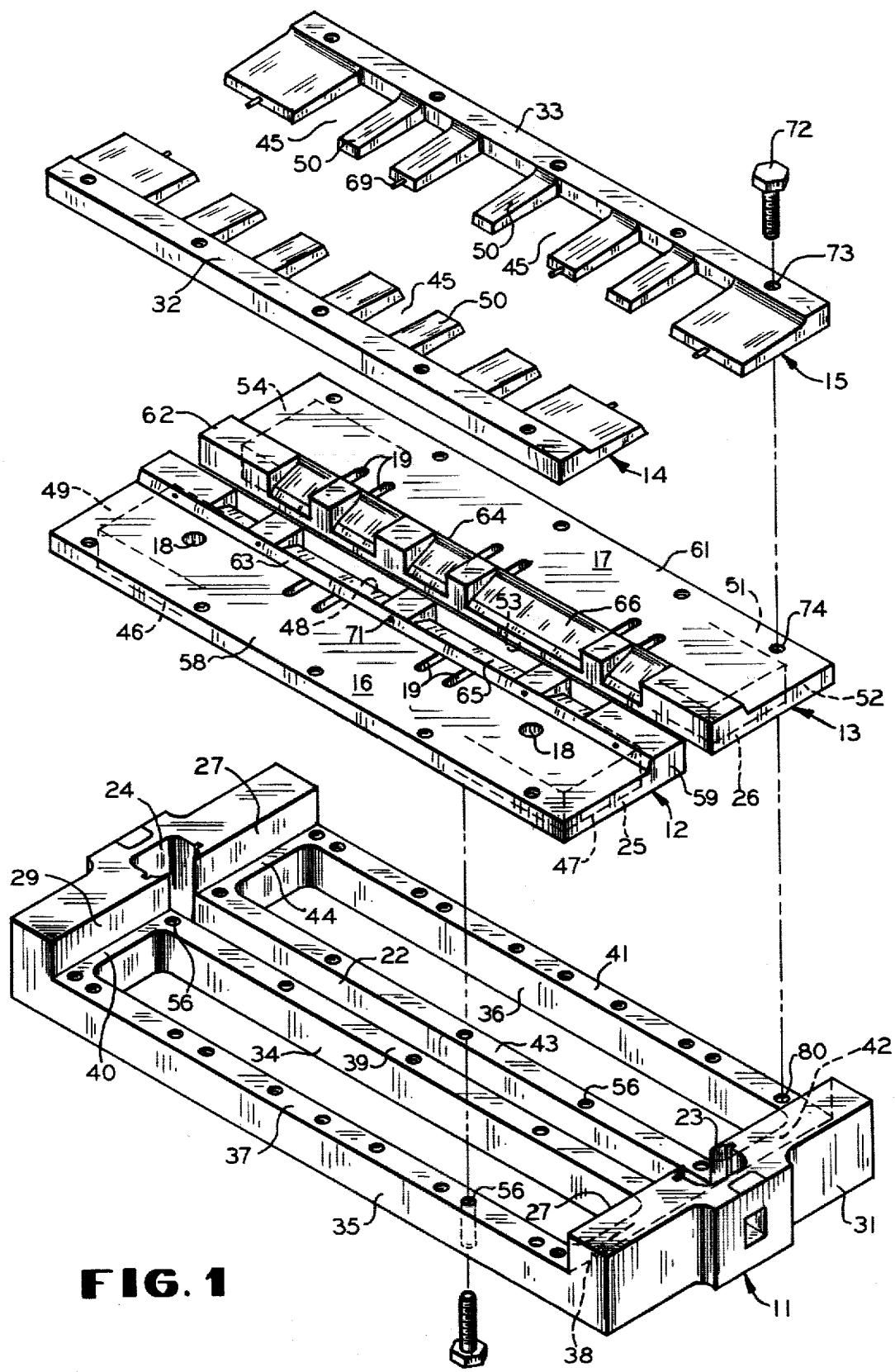
FIG. 1 is an exploded perspective view of one form of mold assembly according to this invention with some of the fastening elements omitted.
Figure 2:
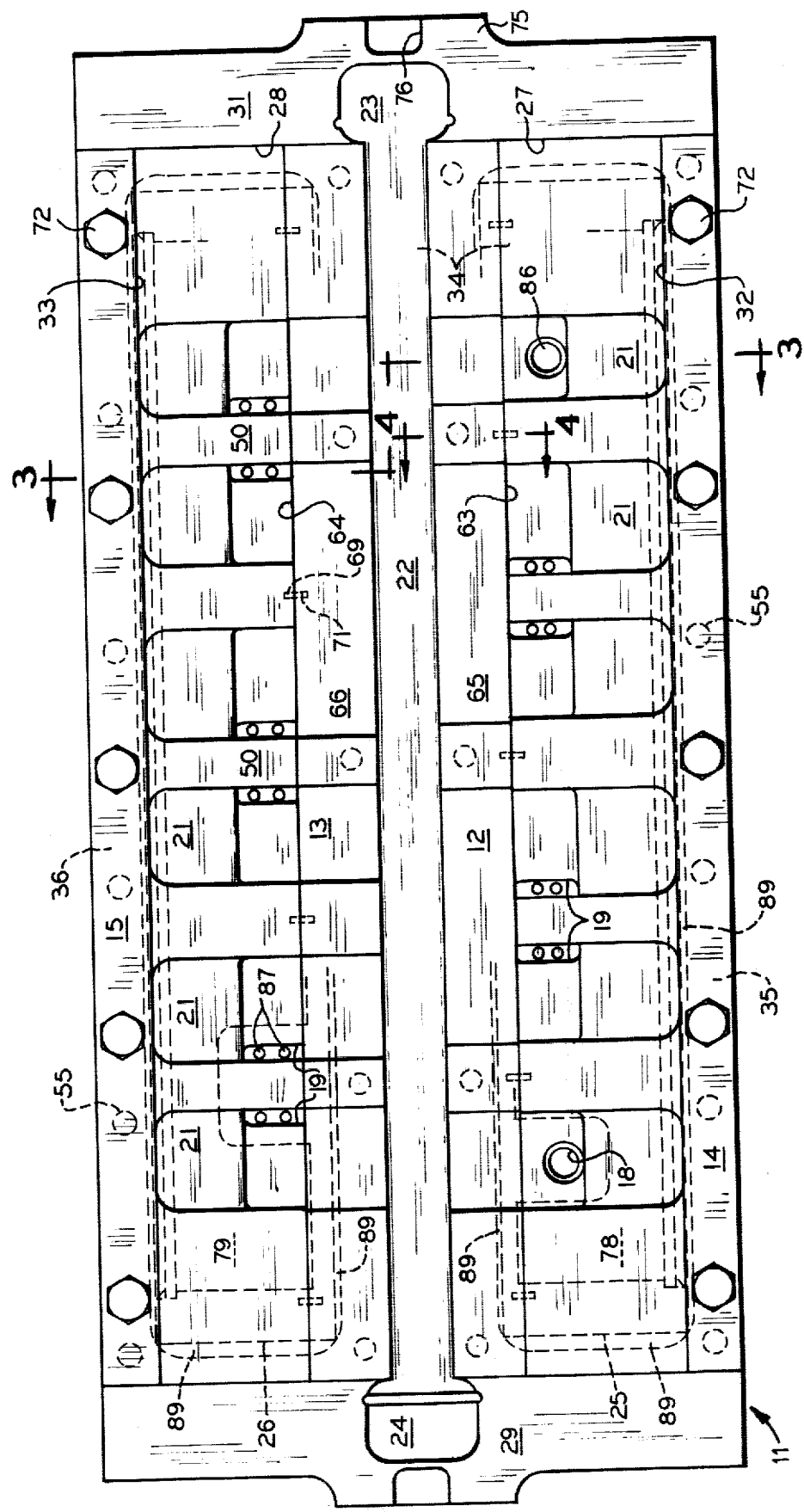
FIG. 2 is a plan view of the mold assembly of FIG. 1 which includes improvements according to this invention.

The mold assembly of this invention is utilized in an apparatus wherein sets of lugs from storage battery plates are electrically and mechanically joined by casting a strap across each of the set of negative and positive plate lugs for one or a plurality of cells of a battery. This cast-on process is accomplished by assembling one or more cells in stacks of alternate positive and negative plates with suitable interleaved insulating spacers, aligning the lugs of the positive plates in a set and those of the negative plates in a set spaced from the positive lugs and immersing the sets simultaneously in mold cavities filled with molten metal fusible with the lugs. The mold cavities are chilled to freeze the molten metal into straps with integral cell connector lugs or terminals.

The cast-on process involves passing a stream of molten metal from a suitable source along a flow channel in the mold assembly adjacent the mold cavities for the straps, and lugs or terminals. Molten metal is fed to the flow channel continuously. When the mold cavities are to be filled, the conduit for the return of the molten metal from the flow channel to the source is blocked. The molten metal depth in the channel increases and overflows the channel walls into the mold cavities. With the cavities filled by this overflow process, the return conduit is opened and the level of molten metal falls to its throughflow level as the excess metal flows to the source. The lugs of an assembly of plates making up one or more cells are immersed in the strap mold/cavities and the mold cavity walls are chilled to freeze the molten metal.

Throughout the cast-on cycle, the contents of the flow-channel remain molten and continues to be circulated. Thus, a substantial temperature difference is established during the freezing of the metal in the cavities between the portion of the mold assembly containing the flow channel and the portion containing the mold cavities. Rapid cast-on cycles are desirable, typically less than two minutes. Hence, the cavity portions must be chilled rapidly. This can be done by passing a cooling fluid, typically water, through a jacket for the mold cavity walls.

At the time the mold assembly is conditioned for the reception of the plate lugs, the molten metal must be brought to a proper temperature and its surface should be deoxidized. This is accomplished by directing a deoxidizing flame onto the upper surface of the mold assembly including the cavity regions and the upper surface of the molten metal in the flow channel and cavities.

The above summarized operating cycle subjects the mold assembly to frequent and abrupt changes in temperature, at least in the mold cavity portions, with attendant thermally induced mechanical stresses. Prior mold assemblies have exhibited relatively short useful lives under these severe conditions of use and have been restricted in the speed at which they are cycled by the excessive heat transfer between the hot flow channel region of the assembly and the chilled mold cavity portion.

The mold assembly of this invention as shown in the drawings is made up of a frame or base 11 advantageously machined from a casting and arranged to mount separably therefrom one or more mold inserts 12 and 13 which may be formed from cold drawn free machine steel. Adapter members 14 and 15 overly the portion of the upper surfaces 16 and 17 of inserts 12 and 13 to cooperate with the inserts in forming mold cavities. Mold cavities 18, 19, and 21 for the terminal posts, connector posts, and lug straps are formed partially in the inserts 12 and 13 and partially in adapter members 14 and 15 superimposed and separately mounted on the insert upper surfaces as comb plates.

The frame or base 11 in combination with the inserts 12 and 13 comprises an assembly which, in the cast-on station, presents a generally horizontal upper surface to the molten metal flowing in a flow channel 22 so that when the channel is dammed at its downstream end at 23, molten metal introduced at its upstream end 24 overflows portions of the upper surface of the assembly. The inserts 12 and 13 have jackets 25 and 26 having hollow interiors beneath portions of the upper surface 16 and 17 and around those portions of mold cavities 18 and 19 extending into those surfaces to facilitate the cooling of cast bodies by the passage of the coolant therethrough. Adapter members 14 and 15 are mounted on the portions of the insert upper surfaces in molten metal tight relationship to those surfaces so that cavities formed in the adapter members are filled with molten metal when the metal in flow channel 22 is caused to overflow. A perimeter dam, in part on the base at the upper portions 27 and 28 of its transverse beams 29 and 31, and in part on the adapter members at their longitudinal back edges 32 and 33, contains the overflowing molten metal on the mold assembly. As shown, the base 11 is relatively massive and has opposed transverse end members or cross arms 29 and 31 joined by an elongate longitudinal member 34 having the flow channel 22 extend along its length with the margins of the flow channel forming a portion of the upper surface of the base upon which the inserts are mounted and the molten metal overflows. This massive base retains heat at least in its flow channel region during the cooling of the cavity walls of the molds to sustain the molten condition of the flowing molten metal. Base 11 also includes longitudinal side beams 35 and 36 spaced from longitudinal member 34 to define with that member and portions of the transverse beams 29 and 31, frames for the reception of cooling jackets 25 and 26 of inserts 12 and 13. The upper surfaces 37-44 of the frame members all lie in a plane to present a planar ledge upon which the inserts are mounted. Inserts 12 and 13 are separably secured between end members 29 and 31 and against longitudinal member 34 to provide a further portion of the upper surface of the mold body over which the overflowed lead flows.

The cavities 45 of the adapter members 14 and 15 are advantageously formed through the thickness of those members with upwardly divergent walls to define mold cavity side walls from which molded bodies can be extracted upward. In such arrangement, the upper surface portions of the inserts 12 and 13 which are in registry with the cavities 45 or spaces between the teeth 40 of the comb form the bottoms of the mold cavities in intimate heat transfer relationship with the coolant passages 78 and 79 in jackets 25 and 26. Where connector posts to adjacent cells of the battery are to be formed integral with the plate connector strap or battery terminals, the upper surface of the inserts are formed with post cavities 19 in registry with the cavities 45 in the adapter member.

Figure 3:
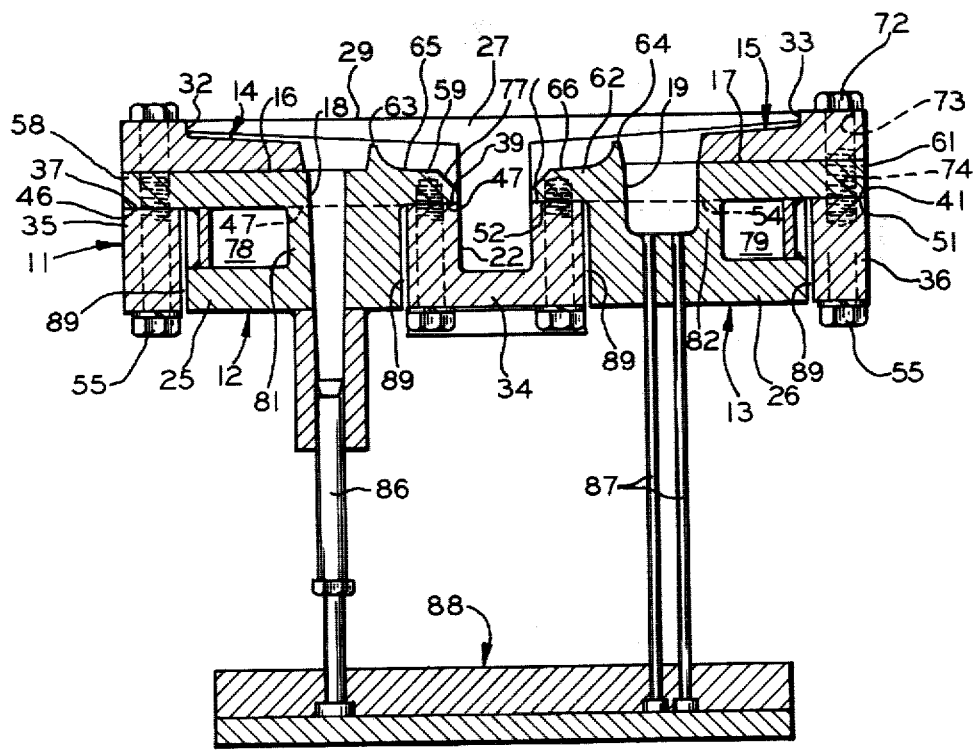
FIG. 3 is a sectional view of the mold assembly taken along the line 3—3 of FIG. 2.
Figure 4:
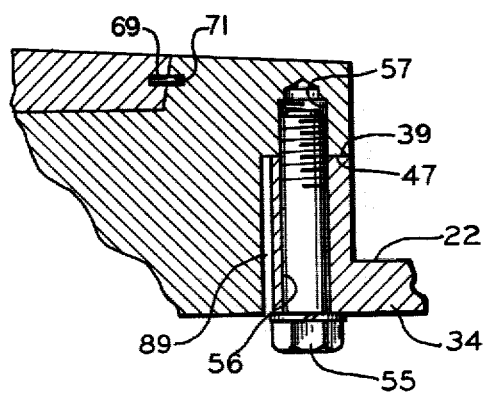
FIG. 4 is a fragmentary sectional view of a detail at the flow channel of the mold taken along the line 4—4 of FIG. 2.

The inserts 12 and 13 have planar under surfaces 46-49 and 51-54 on flanges around the perimeter of their coolant jackets 25 and 26 which can be machined to fit the planar surfaces 37-40 and 41-44 respectively. As best seen in FIGS. 3 and 4, the sides of the longitudinal and transverse base members forming the framed openings are spaced from the cooling jackets 25 and 26 to provide air spaces 89 which are effective thermal insulating regions between the mold cavity-coolant jacket portions of inserts 12 and 13 and the relatively massive base 11 including the lower portion of flow channel 22. The abutting of the surfaces 46-49 and 51-54 of the insert flanges and the surfaces 37-40 and 41-44 afford a broad area of contact in the major dimensions of the assembly such that any expansion and contraction, as induced by thermal cycling, is parallel to those surfaces and does not tend to separate those surfaces. Thermal conduction from the base to the inserts in the mold assembly structure, is limited by the relatively limited cross-section of the flange regions on the inserts.

Inserts 12 and 13 are secured to the base at a plurality of regularly spaced locations around the inserts by means of threaded bolts 55 passing through bores 56 in the base and threaded into tapped bores 57 extending partially through the longitudinal flanged portions 58 and 59 of insert 12 and 61 and 62 of insert 13.

The upper surface of the inserts 12 and 13 on flanges 59 and 62, and the sides of those flanges, form the upper portion of the side wall of flow channel 22 such that the molten metal upper surface is below those flanges when the flow from the downstream end 23 is unobstructed. When the downstream end is obstructed, the continuing in-flow of metal metal raises the level of metal in flow channel 22 above the flanges 59 and 62 to overflow those flanges. In order to direct the flow to and away from the mold cavities, weirs 63 and 64 are formed on the inserts 12 and 13 adjacent the flow channel, and spillways 65 and 66 communicating with the mold cavities, are formed in those weirs.

The portions 16 and 17 of the upper surfaces of inserts 12 and 13 remote from the flow channel are planar to provide a mounting surface or seat for adapter members 14 and 15 respectively.

The adapter members have planar lower surfaces, and top surfaces at least as high as the weirs so that they provide partitions 50 for the cast metal retained in the cavities 18, 19, and 21 behind the weirs. The adapter members 14 and 15 are mounted with surfaces adjacent to and abutting the weir in molten metal tight relationship to the weir. Cavities in the adapter member can be located along the surfaces adjacent to and abutting the weir of the inserts, thus defining indentations between extensions 40 of the adapter as comb teeth, whereby the weir forms one side wall of the mold cavities and the indentations form the remaining side walls of the mold cavities. These extensions or comb teeth are subject to thermal distortion and, tend to develop leak paths for lead into the region between the insert and the adapter member. Fastening means are provided between the insert and the adapter member at these extensions to fasten the extensions against the upper surface of the insert without interfering with the extraction of the molded elements to thereby maintain a molten metal tight relationship between the insert and adapter. One form of fastening is a key in the form of a dowel pin 69 and socket 71 on the ends of the extensions and the side wall of the weir.

Adapters 14 and 15 are secured to the upper face of inserts 12 and 13 by means of threaded bolts 72 spaced along the outer margins of the adapters in bores 73 which register with bores 74 through inserts 12 and 13 and into tapped holes 80 extending into and partially through the base 11.

Frame or base 11 is adapted to be secured to a base support for the machine at its cast-on station by means of bosses 75 containing sockets 76 on each end to receive and be engaged by suitable clamping means. It should be noted that in the illustrated construction, the elongate body portion 34 is centered transverse of the arms 29 and 31 and is formed to have a molten metal flow channel 22 extend throughout its length; however, the flow channel can be rectangular with opposed elongate body portions (not shown) extending with their molten metal flow channels in transverse spaced relationship between the end portions where the strap and post transverse spacings of the battery to be formed are so close as to not permit a central molten metal flow channel. In either construction, an open region bounded by the proximate sides of the cross arms 29 and 31, and sides of the elongate body portions 34, 35, and 36 are adapted to receive mold inserts 12 and 13.

FIG. 3 illustrates some of the mold assembly details which shorten cycle time and lengthen mold assembly life. The sectional view is taken through a battery terminal mold cavity 18 on the left and at intercell connector post mold cavity 19 on the right. Inserts 12 and 13 are shown with the inner mounting flanges 59 and 62 chamfered at 77 to facilitate the flow of molten metal between the channel 22 and the weir-spillway region 63, 65. Coolant jackets 25 and 26 include cavities 78 and 79 which underlie the surfaces 16 and 17 to cool the strap cavities 21 and extend around the sides of bosses 81 and 82 integral with the bodies of inserts 12 and 13 to accomodate the extension of the terminal post cavities 18 and connector post cavities 19, respectively. The open sides of the coolant cavities are closed by plates 83 and 84 welded therein. Coolant is circulated through passages 78 and 79 after the plate lugs have been immersed in the molten metal cavities 21 (by means not shown). Upon solidification of the molten metal as lug connecting straps, the coolant liquid is expelled from the passages 78 and 79 and the passages are dried as by passing air therethrough.

An extension of the terminal post cavity 18 beyond the thickness of insert 12 is accomodated by an extension 85. That extension also provides a guide for terminal post knockout pin 86. Connector post knockout pins 87 are guided in bores in bosses 82 to aid the removal of those posts and their integral lug connector straps. The knockout pins 86 and 87 are operated in unison by raising knockout table 88 after solidification of the elements cast in mold cavities 18, 19 and 21.

It can be appreciated that the advantage of contact areas between the base 11 and inserts 12 and 13 which are flat and horizontal as at 37-40 mating with 46-49 and at 41-44 mating with 51-54 to provide the advantage of a broad area joint secured in compression at regular intervals by bolts 55 and enabling an enhanced thermal isolation between base 11 and inserts 12 and 13, can be utilized in mold structures utilizing no mold adapter combs 14 and 15. Thus, the advantage of the broad contact areas defining joints over which molten metal flows will mitigate against the entry of the metal into the joint in a mold assembly having the entire mold cavity structures formed in inserts 12 and 13. In either the illustrated multi-element mold construction, or the suggested unitary mold construction, the arrangement of the joint surface parallel to the directions of major thermal expansion and contraction, minimizes the the tendency of the joint surfaces to separate. Further, this joint construction minimizes the heat conduction path between the base for containing flowing molten metal, and the chilled inserts for freezing molten metal in the mold cavities since air gaps 89 can be provided between the frames and the depending coolant jacket portions of the inserts over most of the height of the inserts and only the thin cross-section of the flanges on the inserts provide metallic conduction paths for heat.

What is claimed is:

1. A mold assembly for casting straps and posts on plates of storage batteries comprising a horizontally extending base including an elongate longitudinal member and a horizontally extending transverse beam at each end of said elongate longitudinal member; said elongate longitudinal member defining at least a portion of a flow channel extending longitudinally thereof and having a horizontal planar upper surface extending longitudinally thereof adjacent said flow channel; an insert mounted on said horizontal planar upper surface of said elongate longitudinal member and having a horizontally extending upper surface and defining a mold cavity therein; said insert having a body portion adjacent and spaced from said elongate longitudinal member and between said transverse end beams; a longitudinal flange on said insert extending from said body portion thereof adjacent said elongate longitudinal member having a width transverse of the length of said elongate longitudinal member in the dimension parallel to said horizontal planar upper surface of said elongate longitudinal member greater than its average thickness transverse of the length of said elongate longitudinal member in the dimension perpendicular to said horizontal planar upper surface of said elongate longitudinal member and having a horizontal, planar under surface; said horizontal planar upper surface of said elongate longitudinal member mating with said planar under surface of said longitudinal flange of said insert in close fitting, fluid tight relationship; and means spaced along said flange of said insert to draw said under surface of said flange downward onto said planar upper surface of said elongate longitudinal member.

2. A mold assembly according to claim 1 including a horizontal planar upper surface on each of said horizontally extending transverse beams of said base and adjacent the region for receiving said insert body adjacent said elongate longitudinal member and between said horizontally extending transverse beams; flanges on the transverse ends of said insert extending from said body adjacent each horizontally extending transverse beam, said flanges on the transverse ends of said insert each having a horizontal, planar under surface for mating with said horizontal planar upper surface on each of said horizontally extending transverse beams while said horizontal planar under surface of said longitudinal flange on said insert and the upper surface of said elongate longitudinal member are mated.

3. A mold assembly according to claim 2 wherein said elongate longitudinal member and said horizontally extending transverse beam upper surfaces are coplanar and said under surfaces of said mating longitudinal flange and end flanges on said insert are coplanar.

4. A mold assembly according to claim 3 wherein said horizontally extending transverse beams have a dam wall outward from said horizontal planar upper surfaces mating with said flanges on the transverse ends of said insert which is of greater height than said average thickness of said longitudinal flange on said insert.

5. A mold assembly according to claim 1 wherein said elongate longitudinal member horizontal planar upper surface mating with said planar under surface of said longitudinal flange of said insert extends to said flow channel in said beam; said longitudinal flange of said insert has a width greater than the width of said elongate longitudinal member upper surface mating with said planar under surface of said longitudinal flange of said insert; and said longitudinal flange of said insert has an outer longitudinal edge aligned with the side of said flow channel whereby the body of said insert is spaced from said elongate longitudinal member.

6. A mold assembly according to claim 1 including a side beam spaced transversely from said elongate longitudinal member and extending between said horizontally extending transverse beams; said side beam having a flat upper surface adjacent said insert; said insert having a second longitudinal flange extending from said body, said second longitudinal flange having a horizontal planar under surface for mating with said flat upper surface of said side beam; and means spaced along said second longitudinal flange to draw said under surface of said second longitudinal flange downward onto said side beam flat upper surface.

7. A mold assembly according to claim 6 wherein said side beam and said elongate longitudinal member have adjacent faces spaced greater than the width of said insert body whereby the body of said insert is spaced from said side beam and said elongate longitudinal member.

8. A mold assembly according to claim 7 including a horizontal planar upper surface on each of said horizontally extending transverse beams, said upper surface extending transverse of said base and adjacent the region for mounting said insert between said transverse beams flanges on the transverse ends of said insert extending from said body portion adjacent each transverse beam having a horizontal, planar under surface for mating with said horizontal planar upper surface on each of said transverse beams while said flat upper surface of said side beam and said under surface of said second longitudinal flange are mated and said horizontal planar under surface of said longitudinal flange on said insert and the upper surface of said elongate longitudinal member are mated.

9. A mold assembly according to claim 8 wherein said horizontally extending transverse beams have adjacent faces spaced greater than the length of said insert body whereby the body of said insert is spaced from said horizontally extending transverse beams.

* * * * *